(12) United States Patent
Vyroubal

(10) Patent No.: US 8,514,550 B2
(45) Date of Patent: Aug. 20, 2013

(54) SOLID ELECTROLYTIC CAPACITOR CONTAINING A CATHODE TERMINATION WITH A SLOT FOR AN ADHESIVE

(75) Inventor: Ales Vyroubal, Postrelmov (CZ)

(73) Assignee: AVX Corporation, Fountain Inn, SC (US)

( * ) Notice: Subject to any disclaimer, the term of this patent is extended or adjusted under 35 U.S.C. 154(b) by 222 days.

(21) Appl. No.: 13/045,588

(22) Filed: Mar. 11, 2011

(65) Prior Publication Data

US 2012/0229957 A1  Sep. 13, 2012

(51) Int. Cl.
*H01G 4/228* (2006.01)
*H01G 9/00* (2006.01)
*H01G 9/04* (2006.01)
*H01G 9/145* (2006.01)
*H01G 9/012* (2006.01)
*H01G 9/15* (2006.01)

(52) U.S. Cl.
CPC . *H01G 9/012* (2013.01); *H01G 9/15* (2013.01)
USPC .......................................... 361/540; 361/532

(58) Field of Classification Search
CPC ................................. H01G 9/012; H01G 9/15
USPC ................... 361/540, 533, 532, 523
See application file for complete search history.

(56) References Cited

U.S. PATENT DOCUMENTS

| 3,345,545 | A | 10/1967 | Bourgault et al. |
| 4,085,435 | A | 4/1978 | Galvagni |
| 4,945,452 | A | 7/1990 | Sturmer et al. |
| 5,198,968 | A | 3/1993 | Galvagni |
| 5,357,399 | A | 10/1994 | Salisbury |
| 5,394,295 | A | 2/1995 | Galvagni et al. |
| 5,457,862 | A | 10/1995 | Sakata et al. |
| 5,473,503 | A | 12/1995 | Sakata et al. |
| 5,495,386 | A | 2/1996 | Kulkarni |
| 5,729,428 | A | 3/1998 | Sakata et al. |
| 5,812,367 | A | 9/1998 | Kudoh et al. |

(Continued)

FOREIGN PATENT DOCUMENTS

| JP | 62150814 A | * 7/1987 |
| JP | 01037006 A | * 2/1989 |

(Continued)

OTHER PUBLICATIONS

Machine transltaion of JP2009065140 published on Mar. 26, 2009.*

(Continued)

*Primary Examiner* — David M Sinclair
(74) *Attorney, Agent, or Firm* — Dority & Manning, P.A.

(57) ABSTRACT

A capacitor containing a solid electrolytic capacitor element that includes an anode, dielectric, and a cathode that includes a solid electrolyte is provided. An anode lead extends from the anode and is electrically connected to an anode termination. Likewise, a cathode termination is electrically connected to the cathode. The cathode termination contains a planar portion that is oriented generally parallel to a lower surface of the capacitor element. An interior slot is defined by the planar portion within which is disposed a conductive adhesive that connects the cathode termination to the capacitor element. By disposing the adhesive within a slot of a planar portion of the cathode termination, the present inventors have discovered that the tendency of the adhesive to bleed toward the edges of the termination can be limited. Among other things, this improves the mechanical stability of the capacitor upon encapsulation and also improves electrical performance.

20 Claims, 5 Drawing Sheets

(56) References Cited

U.S. PATENT DOCUMENTS

| | | | |
|---|---|---|---|
| 5,949,639 | A | 9/1999 | Maeda et al. |
| 6,191,936 | B1 | 2/2001 | Webber et al. |
| 6,197,252 | B1 | 3/2001 | Bishop et al. |
| 6,236,561 | B1 | 5/2001 | Ogino et al. |
| 6,322,912 | B1 | 11/2001 | Fife |
| 6,391,275 | B1 | 5/2002 | Fife |
| 6,416,730 | B1 | 7/2002 | Fife |
| 6,519,135 | B2 | 2/2003 | Sano et al. |
| 6,527,937 | B2 | 3/2003 | Fife |
| 6,576,099 | B2 | 6/2003 | Kimmel et al. |
| 6,592,740 | B2 | 7/2003 | Fife |
| 6,616,713 | B2 | 9/2003 | Sano et al. |
| 6,639,787 | B2 | 10/2003 | Kimmel et al. |
| 6,674,635 | B1 | 1/2004 | Fife et al. |
| 6,751,086 | B2 | 6/2004 | Matsumoto |
| 6,882,521 | B2 | 4/2005 | Tsutsui et al. |
| 6,903,922 | B2 * | 6/2005 | Sano et al. .............. 361/533 |
| 6,972,943 | B2 * | 12/2005 | Kato et al. .............. 361/533 |
| 7,116,548 | B2 | 10/2006 | Satterfield, Jr. et al. |
| 7,220,397 | B2 | 5/2007 | Kimmel et al. |
| 7,262,511 | B2 | 8/2007 | Osako et al. |
| 7,283,352 | B1 * | 10/2007 | Matsuoka et al. .......... 361/540 |
| 7,320,924 | B2 * | 1/2008 | Kida et al. .............. 438/396 |
| 7,333,319 | B2 * | 2/2008 | Matsuoka ................ 361/523 |
| 7,341,705 | B2 | 3/2008 | Schnitter |
| 7,352,561 | B2 | 4/2008 | Nakamura |
| 7,381,396 | B2 | 6/2008 | Thomas et al. |
| 7,419,926 | B2 | 9/2008 | Schnitter et al. |
| 7,515,396 | B2 | 4/2009 | Biler |
| 7,542,267 | B2 | 6/2009 | Ishijima |
| 2008/0285209 | A1 * | 11/2008 | Horio .................... 361/523 |
| 2009/0231784 | A1 | 9/2009 | Matsuoka et al. |
| 2010/0103591 | A1 * | 4/2010 | Fujii et al. .............. 361/540 |
| 2010/0271758 | A1 | 10/2010 | Furuzawa et al. |

FOREIGN PATENT DOCUMENTS

| | | | | |
|---|---|---|---|---|
| JP | 03073510 | A | * | 3/1991 |
| JP | 05343271 | A | * | 12/1993 |
| JP | 07022282 | A | * | 1/1995 |
| JP | 7335493 | A | | 12/1995 |
| JP | 2005079357 | A | * | 3/2005 |
| JP | 2005101480 | A | | 4/2005 |
| JP | 2006237195 | A | * | 9/2006 |
| JP | 2006253367 | A | | 9/2006 |
| JP | 2006269865 | A | | 10/2006 |
| JP | 2007081069 | A | * | 3/2007 |
| JP | 2007096021 | A | | 4/2007 |
| JP | 2007103400 | A | | 4/2007 |
| JP | 2007149732 | A | * | 6/2007 |
| JP | 2008060596 | A | | 3/2008 |
| JP | 2008153702 | A | | 7/2008 |
| JP | 2009065140 | A | * | 3/2009 |

OTHER PUBLICATIONS

Search Report for GB1203806.3 dated Jul. 5, 2012, 2 pages.
Related US Application Form.

* cited by examiner

US 8,514,550 B2

SOLID ELECTROLYTIC CAPACITOR CONTAINING A CATHODE TERMINATION WITH A SLOT FOR AN ADHESIVE

BACKGROUND OF THE INVENTION

Solid electrolytic capacitors (e.g., tantalum capacitors) have been a major contributor to the miniaturization of electronic circuits and have made possible the application of such circuits in extreme environments. The anode termination may contain a portion that is bent upwardly toward the capacitor and welded to a wire extending from the anode. The cathode termination may be flat and be connected to the bottom surface of the capacitor using a conductive adhesive. One problem with such conventional solid electrolytic capacitors, however, is that the conductive adhesive can sometimes bleed out toward the edges of the termination before it is cured. This can sometimes cause cracks to occur within the resulting molded material, which may lead to mechanical stability and partial delamination of the cathode termination from the capacitor element. As such, a need currently exists for an improved solid electrolytic capacitor assembly.

SUMMARY OF THE INVENTION

In accordance with one embodiment of the present invention, a capacitor is disclosed that comprises a capacitor element that defines an upper surface, lower surface, front surface, and rear surface. The capacitor element includes an anode, a dielectric layer overlying the anode, and a cathode overlying the dielectric layer that includes a solid electrolyte. An anode lead is electrically connected to the anode and to an anode termination. A cathode termination is electrically connected to the cathode and contains a planar portion oriented generally parallel to the lower surface of the capacitor element. The planar portion defines a slot within which a conductive adhesive is disposed, the conductive adhesive connecting the planar portion of the cathode termination to the capacitor element. A molding material encapsulates the capacitor element and leaves exposed at least a part of the anode termination and at least a part of the cathode termination.

In accordance with another embodiment of the present invention, a method for forming a capacitor from a capacitor element and a leadframe is disclosed. The leadframe contains an anode portion and a cathode portion. The cathode portion includes a base. The method comprises bending the base of the cathode portion to form a first section that is positioned vertically above a second section, wherein the slot is defined by at least the first section. A conductive adhesive is disposed within the slot. The capacitor element is positioned onto the leadframe so that the capacitor element contacts the conductive adhesive. An anode lead of the capacitor element is electrically connected to the anode portion of the leadframe.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
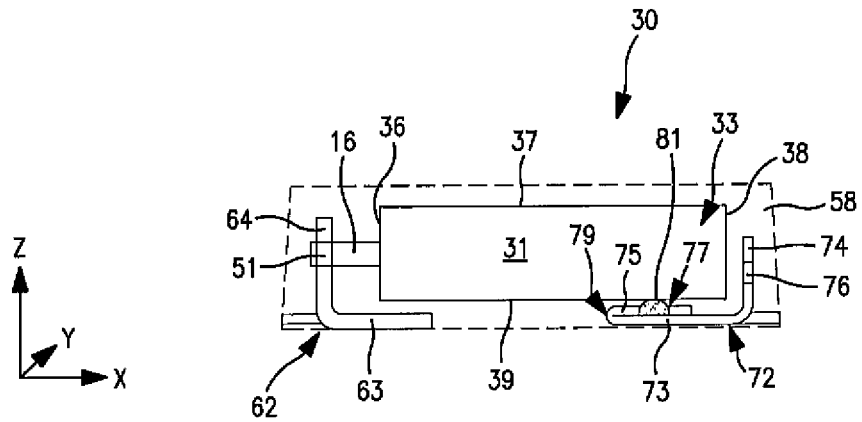
FIG. 1 is a cross-sectional view of one embodiment of the electrolytic capacitor of the present invention.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a capacitor containing a solid electrolytic capacitor element that includes an anode, dielectric, and a cathode that includes a solid electrolyte. An anode lead extends from the anode and is electrically connected to an anode termination. Likewise, a cathode termination is electrically connected to the cathode. The cathode termination contains a planar portion that is oriented generally parallel to a lower surface of the capacitor element. A slot is defined by the planar portion within which is disposed a conductive adhesive that connects the cathode termination to the capacitor element. By disposing the adhesive within a slot of a planar portion of the cathode termination, the present inventors have discovered that the tendency of the adhesive to bleed toward the edges of the termination can be limited. Among other things, this improves the mechanical stability of the capacitor upon encapsulation and also improves electrical performance.

Referring to FIG. 1, one embodiment of a capacitor 30 is shown that includes an anode termination 62 and a cathode termination 72 in electrical connection with a capacitor element 33 having an upper surface 37, lower surface 39, front surface 36, rear surface 38, side surface 31, and an opposing side surface (not shown). Although not specifically shown, the capacitor element 33 contains an anode, dielectric, and solid electrolyte. The anode may be formed from a valve metal composition having a high specific charge, such as about 5,000 μF*V/g or more, in some embodiments about 25,000 μF*V/g or more, in some embodiments about 40,000 μF*V/g or more, and in some embodiments, from about 70,000 to about 200,000 μF*V/g or more. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of $1:1.0\pm1.0$, in some embodiments $1:1.0\pm0.3$, in some embodiments $1:1.0\pm0.1$, and in some embodiments, $1:1.0\pm0.05$. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

Conventional fabricating procedures may generally be utilized to form the anode. In one embodiment, a tantalum or niobium oxide powder having a certain particle size is first selected. For example, the particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 $g/cm^3$, in some embodiments from about 0.2 to about 4.0 $g/cm^3$, and in some embodiments, from about 0.5 to about 3.0 $g/cm^3$.

To facilitate the construction of the anode, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), polyvinyl alcohols, naphthalene, vegetable wax, and microwaxes (purified paraffins). The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead (e.g., tantalum wire). It should be further appreciated that the anode lead may alternatively be attached (e.g., welded) to the anode body subsequent to pressing and/or sintering of the anode body. After compression, any binder/lubricant may be removed by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the pellet is sintered to form a porous, integral mass. For example, in one embodiment, the pellet may be sintered at a temperature of from about 1200° C. to about 2000° C., and in some embodiments, from about 1500° C. to about 1800° C. under vacuum or an inert atmosphere. Upon sintering, the pellet shrinks due to the growth of bonds between the particles. In addition to the techniques described above, any other technique for constructing the anode body may also be utilized in accordance with the present invention, such as described in U.S. Pat. No. 4,085,435 to Galvagni; U.S. Pat. No. 4,945,452 to Sturmer, et al.; U.S. Pat. No. 5,198,968 to Galvagni; U.S. Pat. No. 5,357,399 to Salisbury; U.S. Pat. No. 5,394,295 to Galvagni, et al.; U.S. Pat. No. 5,495,386 to Kulkarni; and U.S. Pat. No. 6,322,912 to Fife, which are incorporated herein in their entirety by reference thereto for all purposes.

Although not required, the thickness of the anode may be selected to improve the electrical performance of the capacitor. For example, the thickness of the anode may be about 4 millimeters or less, in some embodiments, from about 0.05 to about 2 millimeters, and in some embodiments, from about 0.1 to about 1 millimeter. The shape of the anode may also be selected to improve the electrical properties of the resulting capacitor. For example, the anode may have a shape that is curved, sinusoidal, rectangular, U-shaped, V-shaped, etc. The anode may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

An anode lead 16 (e.g., wire, sheet, etc.) is also electrically connected to the anode. The lead 16 is typically formed from any electrically conductive material, such as tantalum, niobium, nickel, aluminum, hafnium, titanium, etc., as well as oxides and/or nitrides of thereof. The manner in which the lead 16 is connected may vary as is known in the art, such as by coupling the lead using resistance or laser welding, embedding the lead into the anode body during its formation (e.g., prior to sintering), etc. In the illustrated embodiment, for example, the lead 16 is in the form of an embedded wire that extends from the front surface 36 of the capacitor element 33.

Once constructed, the anode may be anodized so that a dielectric layer is formed over and/or within the anode. Anodization is an electrochemical process by which the anode is oxidized to form a material having a relatively high dielectric constant. For example, a niobium oxide (NbO) anode may be anodized to niobium pentoxide ($Nb_2O_5$). Typically, anodization is performed by initially applying an electrolyte to the anode, such as by dipping anode into the electrolyte. The electrolyte is generally in the form of a liquid, such as a solution (e.g., aqueous or non-aqueous), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to help achieve the desired oxide. In fact, water may constitute about 50 wt. % or more, in some embodiments, about 70 wt. % or more, and in some embodiments, about 90 wt. % to 100 wt. % of the solvent(s) used in the electrolyte.

The electrolyte is ionically conductive and may have an ionic conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the ionic conductivity of the electrolyte, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired ionic conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

A current is passed through the electrolyte to form the dielectric layer. The value of voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the surface of the anode. Of course, other known methods may also be employed, such as pulse or step potentiostatic methods. The voltage typically ranges from about 4 to about 200 V, and in some embodiments, from about 9 to about 100 V. During anodic oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

Once the dielectric layer is formed, a protective coating may optionally be applied, such as one made of a relatively insulative resinous material (natural or synthetic). Such materials may have a specific resistivity of greater than about 10 Ω/cm, in some embodiments greater than about 100, in some embodiments greater than about 1,000 Ω/cm, in some embodiments greater than about $1 \times 10^5$ Ω/cm, and in some embodiments, greater than about $1 \times 10^{10}$ Ω/cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The anodized part is thereafter subjected to a step for forming a cathode that includes a solid electrolyte, such as a manganese dioxide, conductive polymer, etc. A manganese dioxide solid electrolyte may, for instance, be formed by the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes.

A conductive polymer coating may also be employed that contains one or more polyheterocycles (e.g., polypyrroles; polythiophenes, poly(3,4-ethylenedioxythiophene) (PEDT); polyanilines); polyacetylenes; poly-p-phenylenes; polyphenolates; and derivatives thereof. The conductive polymer coating may also be formed from multiple conductive polymer layers. For example, in one embodiment, the conductive polymer cathode may contain one layer formed from PEDT and another layer formed from a polypyrrole. Various methods may be utilized to apply the conductive polymer coating onto the anode part. For instance, conventional techniques such as electropolymerization, screen-printing, dipping, electrophoretic coating, and spraying, may be used to form a conductive polymer coating.

In one particular embodiment, the conductive coating contains a substituted polythiophene, which is π-conjugated and has intrinsic electrical conductivity (e.g., electrical conductivity of at least about 1 μS cm$^{-1}$). The substituted polythiophene may have recurring units of general formula (I), formula (II), or both:

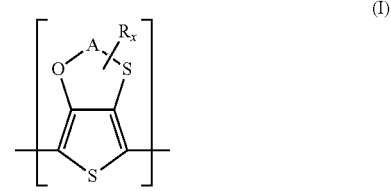

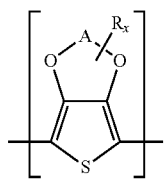

(II)

wherein,

A is an optionally substituted $C_1$ to $C_5$ alkylene radical (e.g., methylene, ethylene, n-propylene, n-butylene, n-pentylene, etc.);

R is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and x is an integer from 0 to 8, in some embodiments, from 0 to 2, and in some embodiments, x is 0. Example of substituents for the radicals "A" or "R" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

The total number of recurring units of general formula (I) or formula (II) or of general formulae (I) and (II) is typically from 2 to 2,000, and in some embodiments, from 2 to 100.

Particularly suitable substituted polythiophenes are those in which "A" is an optionally substituted $C_2$ to $C_3$ alkylene radical and x is 0 or 1. In one particular embodiment, the substituted polythiophene is poly(3,4-ethylenedioxythiophene) ("PEDT"), which has recurring units of formula (II), wherein "A" is $CH_2$—$CH_2$ and "x" is 0. The monomers used to form such polymers may vary as desired. For instance, particularly suitable monomers are substituted 3,4-alkylenedioxythiophenes having the general formula (III), (IV), or both:

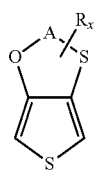

(III)

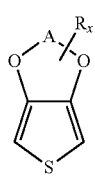

(IV)

wherein, A, R, and X are as defined above.

Examples of such monomers include, for instance, optionally substituted 3,4-ethylenedioxythiophenes. One commercially suitable example of 3,4-ethylenedioxythiophene is available from H.C. Starck GmbH under the designation Clevios™ M. Derivatives of these monomers may also be employed that are, for example, dimers or trimers of the above monomers. Higher molecular derivatives, i.e., tetramers, pentamers, etc, of the monomers are suitable for use in the present invention. The derivatives may be made up of identical or different monomer units and used in pure form and in a mixture with one another and/or with the monomers. Oxidized or reduced forms of these precursors may also be employed.

The thiophene monomers, such as described above, may be chemically polymerized in the presence of an oxidative catalyst. The oxidative catalyst typically includes a transition metal cation, such as iron(III), copper(II), chromium(VI), cerium(IV), manganese(IV), manganese(VII), ruthenium (III) cations, etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst employed in the precursor solution has both a catalytic and doping functionality in that it includes a cation (e.g., transition metal) and anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron (III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron (III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from H.C. Starck GmbH under the designation Clevios™ C.

Various methods may be utilized to form the conductive coating. In one embodiment, the oxidative catalyst and monomer are applied, either sequentially or together, such that the polymerization reaction occurs in situ on the part. Suitable application techniques may include screen-printing, dipping, electrophoretic coating, and spraying, may be used to form a conductive polymer coating. As an example, monomer may initially be mixed with the oxidative catalyst to form a precursor solution. Once the mixture is formed, it may be applied and allowed to polymerize so that the conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The part may then be dried to remove the solvent therefrom. Thereafter, the part may be dipped into a solution containing the monomer.

Polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

In addition to or in conjunction with coating that are formed by in situ application, a conductive coating may also be employed that is in the form of a dispersion of conductive polymer particles. Although their size may vary, it is typically desired that the particles possess a small diameter to increase the surface area available for adhering to the anode part. For example, the particles may have an average diameter of from about 1 to about 500 nanometers, in some embodiments from about 5 to about 400 nanometers, and in some embodiments, from about 10 to about 300 nanometers. The $D_{90}$ value of the particles (particles having a diameter of less than or equal to the $D_{90}$ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc.

The formation of the conductive polymers into a particulate form may be enhanced by using a separate counterion to counteract the positive charge carried by the substituted polythiophene. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to substituted polythiophenes in a given layer is typically from about 0.5:1 to about 50:1, in some embodiments from about 1:1 to about 30:1, and in some embodiments, from about 2:1 to about 20:1. The weight of the substituted polythiophene corresponds referred to the above-referenced weight ratios refers to the weighed-in portion of the monomers used, assuming that a complete conversion occurs during polymerization.

The dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking. Other components may also be included within the dispersion as is known in the art, such as dispersion agents (e.g., water), surface-active substances, etc.

If desired, one or more of the above-described application steps may be repeated until the desired thickness of the coating is achieved. In some embodiments, only a relatively thin layer of the coating is formed at a time. The total target thickness of the coating may generally vary depending on the desired properties of the capacitor. Typically, the resulting conductive polymer coating has a thickness of from about 0.2 micrometers ("μm") to about 50 μm, in some embodiments from about 0.5 μm to about 20 μm, and in some embodiments, from about 1 μm to about 5 μm. It should be understood that the thickness of the coating is not necessarily the same at all locations on the part. Nevertheless, the average thickness of the coating generally falls within the ranges noted above.

The conductive polymer coating may optionally be healed. Healing may occur after each application of a conductive polymer layer or may occur after the application of the entire conductive polymer coating. In some embodiments, the conductive polymer can be healed by dipping the part into an electrolyte solution, and thereafter applying a constant voltage to the solution until the current is reduced to a preselected level. If desired, such healing can be accomplished in multiple steps. For example, an electrolyte solution can be a dilute solution of the monomer, the catalyst, and dopant in an alcohol solvent (e.g., ethanol). The coating may also be washed if desired to remove various byproducts, excess reagents, and so forth.

If desired, the part may optionally be applied with an external coating. The external coating may contain at least one carbonaceous layer and at least one metal layer that overlies the carbonaceous layer. The metal layer may act as a solderable conductor, contact layer, and/or charge collector for the capacitor, and may be formed from a conductive metal, such as copper, nickel, silver, nickel, zinc, tin, palladium, lead, copper, aluminum, molybdenum, titanium, iron, zirconium, magnesium, and alloys thereof. Silver is a particularly suitable conductive metal for use in the layer. The carbonaceous layer may limit contact between the metal layer and the solid electrolyte, which would otherwise increase the resistance of the capacitor. The carbonaceous layer may be formed from a variety of known carbonaceous materials, such as graphite, activated carbon, carbon black, etc. The thickness of the carbonaceous layer is typically within the range of from about 1 µm to about 50 µm, in some embodiments from about 2 µm to about 30 µm, and in some embodiments, from about 5 µm to about 10 µm. Likewise, the thickness of the metal layer is typically within the range of from about 1 µm to about 100 µm, in some embodiments from about 5 µm to about 50 µm, and in some embodiments, from about 10 µm to about 25 µm.

Referring again to FIG. 1, regardless of the manner in which it the capacitor element 33 is formed, it is generally provided in electrical contact with the anode termination 62 and cathode termination 72. The manner in which the anode termination 62 is connected to the capacitor element 33 is not critical. For example, in FIG. 1, the anode termination 62 is shown as containing a planar portion 63 that is relatively flat and positioned generally parallel to the lower surface 39 of the capacitor element 33 and an upstanding portion 64 that is positioned substantially perpendicular (e.g., 90°±5°) to the planar portion 63. As shown, the upstanding portion 64 also defines a slot 51 for receiving the anode lead 16. The slot 51 may have any of a variety of different shapes and/or sizes. In the illustrated embodiment, for example, the slot 51 has a "U-shape" for further enhancing surface contact and mechanical stability of the lead 16.

A variety of different configurations may generally be employed in the present invention that employ a slot in the cathode termination for receiving a conductive adhesive. In the embodiment shown in FIG. 1, for example, an interior slot is formed in a folded section of a planar portion of the cathode termination. More particularly, the cathode termination 72 contains a planar portion 79 that is oriented generally parallel to the lower surface 39 of the capacitor element 33. The planar portion 79 is formed from a first planar section 75 that is folded vertically above a second planar section 73 (e.g., in the −z direction). While shown in this embodiment as being integral, it should be understood that the sections 73 and 75 may be separate and need not be folded in the manner shown. Such a "folded" configuration can increase the total thickness of the planar portion, which may aid in positioning and alignment of the capacitor element. Furthermore, due to its higher vertical position, the first planar section 75 can be substantially encapsulated by the molding material, which can reduce the likelihood of delamination even if a portion of the molding material cracks. In any event, a slot 77 is defined in the interior of at least the first planar section 75 for receiving a conductive adhesive 81 that connects the cathode termination 72 to the capacitor element 33. Although not expressly shown, it should be understood that the slot 77 may also extend into the second planar section 73 if desired. The profile of the slot may vary as desired, so long as it is generally capable of receiving a conductive adhesive therein. For example, a rectangular-shaped profile is employed for the slot 77 in FIG. 1. Other suitable profile shapes may include, for instance, square, triangular, elliptical, circular, etc.

The cathode termination 72 of FIG. 1 also contains an upstanding portion 74 that is oriented substantially perpendicular (e.g., 90°±5°) to the lower surface 39 of the capacitor element 33 and to the planar sections 73 and 75. The upstanding portion 74 is in electrical contact and generally parallel to the rear surface 38 of the capacitor element 33. Optionally, the upstanding portion 74 may define an aperture 76 that facilitates its ability to be folded during manufacture of the capacitor. Although depicted as being integral, it should also be understood that the planar and upstanding portions may alternatively be separate pieces that are connected together, either directly or via an additional conductive element (e.g., metal).

Figure 4:
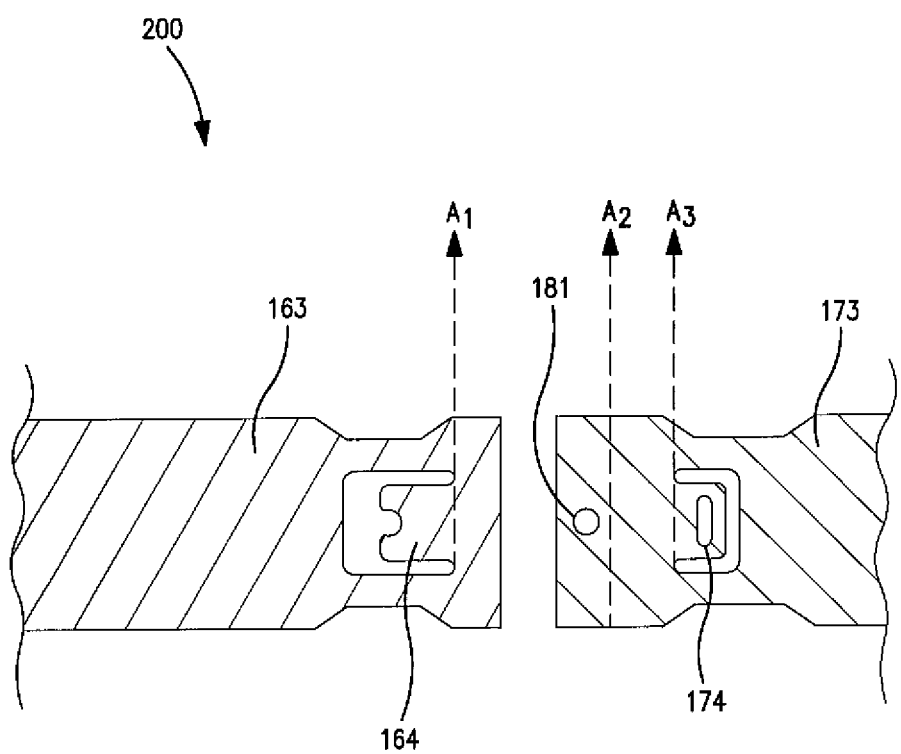
FIG. 4 is a top view of a leadframe that may be employed to form the electrolytic capacitor shown in FIG. 1.

Any of a variety of different techniques may generally be employed to form a cathode termination with a slot as shown in FIG. 1. In one embodiment, for example, a leadframe may be provided that is manipulated into the desired configuration for forming the adhesive slot. Referring to FIG. 4, for example, one embodiment of a leadframe for forming the capacitor of FIG. 1 is shown as element 200. For sake of simplicity, the formation of only a single capacitor will be described. It should be understood, however, that the leadframe may contain multiple sections that are cut into individual capacitor assemblies. It should also be understood that only a portion of the leadframe is shown, and that it may contain other components not expressly shown. For example, the terminations may be initially connected via a metal sheet that is subsequently removed during manufacture of the capacitor.

The leadframe 200 is generally formed from a conductive material, such as a metal (e.g., copper, nickel, silver, nickel, zinc, tin, palladium, lead, copper, aluminum, molybdenum, titanium, iron, zirconium, magnesium, and alloys thereof). Particularly suitable metals include, for instance, copper, copper alloys (e.g., copper-zirconium, copper-magnesium, copper-zinc, or copper-iron), nickel, and nickel alloys (e.g., nickel-iron). One exemplary conductive material is a copper-iron alloy metal plate available from Wieland (Germany). If desired, the surface of the leadframe 200 may be electroplated with nickel, silver, gold, tin, etc. as is known in the art to ensure that the final part is mountable to the circuit board. In one particular embodiment, both surfaces of the leadframe 200 are plated with nickel and silver flashes, respectively, and the mounting surface is also plated with a tin solder layer.

The leadframe 200 of FIG. 4 is shown in an initial "flat" configuration. In this embodiment, the anode termination is formed from a base 163 and a tab 164 extending therefrom. The tab 164 may be bent upwardly along a fold axis "$A_1$" to form the upstanding portion 64 and the U-shaped slot 51. (FIG. 1). The cathode termination is likewise formed from a base 173 and a tab 174 extending therefrom. The tab 174 may be bent upwardly along a fold axis "$A_3$" to form the upstanding portion 74. To form the planar sections 73 and 75, the base 173 is folded upwardly along axis "$A_2$." In this manner, the front portion of the base 173 will constitute the first planar section 75 and the rear portion will constitute the second planar section 73 (FIG. 1). A recess 181 (e.g., hole) is also defined in the in the base 173 so that when folded, it is positioned adjacent to an upper surface of the second section 73 and forms the interior slot 77 for the conductive adhesive. (FIG. 1). The recess 181 may extend completely through the base 173 as shown, or it may extend only through a portion of the height of the base. Further, while shown in this embodiment as having a circular shape, it should be understood that any cross-sectional shape for the recess 181 and slot 77 may be used, such as square, rectangular, elliptical, triangular, trapezoidal, etc.

Figure 5:
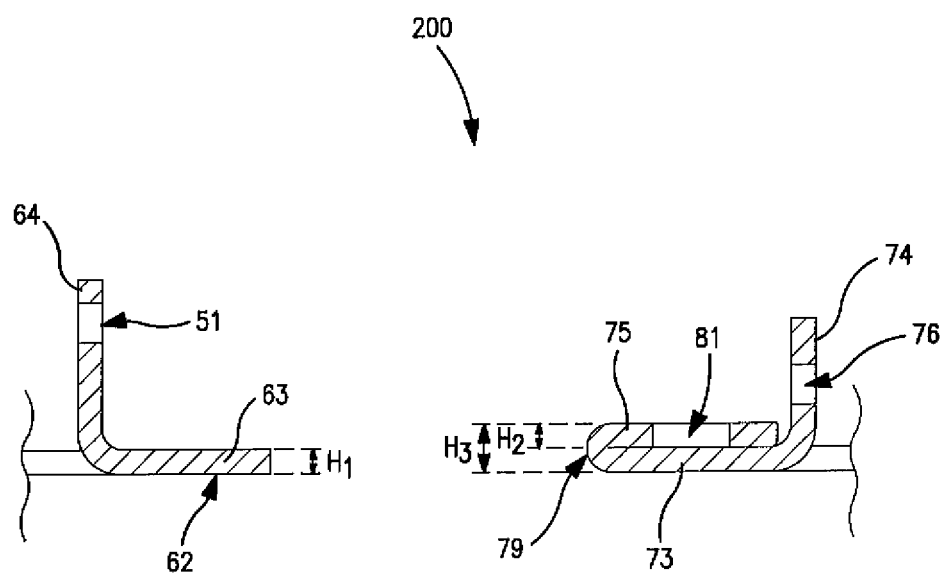
FIG. 5 is a side view of the leadframe of FIG. 4 after the anode and cathode terminations have been folded into the desired configuration.

By folding the leadframe as described above, the anode and cathode terminations may be formed in the desired configuration. Referring to FIG. 5, for instance, the leadframe 200 is in a folded configuration and contains an anode termination 62 and a cathode termination 72. As indicated above, the anode termination 62 of this embodiment includes a planar portion 63 and an upstanding portion 64 that defines a slot 51 for receiving the anode lead. The cathode termination 72 likewise contains an upstanding portion 74 that defines an aperture 76, an interior slot 77 defined by a first planar section 75, and a second planar section 73.

The thickness of the slot is generally large enough so that it can accommodate the desired amount of conductive adhesive, but small enough so that it does not adversely impact the volumetric efficiency of the capacitor. For example, the thickness of the slot may be from about 0.01 to about 1 millimeter, in some embodiments from about 0.02 to about 0.5 millimeters, and from about 0.05 to about 0.2 millimeters. Referring again to FIG. 5, one particular embodiment of the slot is shown that has a thickness "$H_2$", which may fall within the ranges noted above. Although not required, the thickness of the first planar section 75 in this embodiment is also represented by the thickness designation "$H_2$" and thus may fall within the ranges noted above. To provide sufficient mechanical stability, it is typically desired that the thickness of the slot 77 does not constitute too much of the total thickness of the planar portion 79 ("$H_3$") of the cathode termination 72. That is, the ratio of the slot thickness "$H_2$" to the total thickness "$H_3$" of the planar portion 79 may be from about 0.1 to about 1, in some embodiments from about 0.2 to about 0.8, and in some embodiments, from about 0.3 to about 0.6. The total thickness "$H_3$" may, for example, range from about 0.02 to about 2 millimeters, in some embodiments from about 0.04 to about 1 millimeter, and from about 0.1 to about 0.4 millimeters. Although not necessarily required, the total thickness of the planar portion 79 of the cathode termination 72 ("$H_3$") may be greater than the total thickness of the planar portion 63 of the anode termination 62 ("$H_1$"). Among other things, this may aid in positioning and alignment of the capacitor element on the terminations. For example, the ratio of the total thickness "$H_3$" of the planar portion 79 to the total thickness "$H_1$" of the planar portion 63 may be from about 0.4 to about 5, in some embodiments from about 0.5 to about 4, and in some embodiments, from about 1 to about 3. The total thickness "$H_1$" may, for example, range from about 0.01 to about 1 millimeter, in some embodiments from about 0.02 to about 0.5 millimeters, and from about 0.05 to about 0.2 millimeters.

Figure 2:
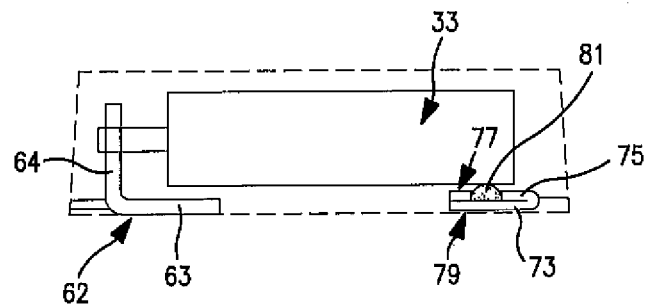
FIG. 2 is a cross-sectional view of another embodiment of the electrolytic capacitor of the present invention.
Figure 3:
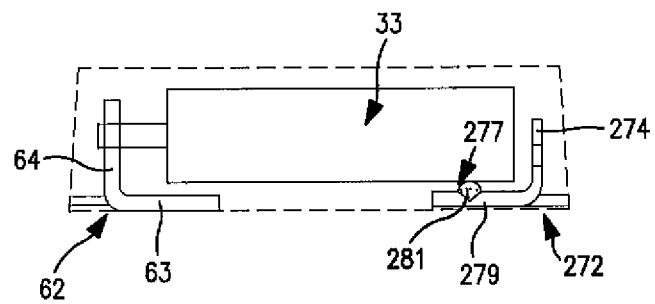
FIG. 3 is a cross-sectional view of yet another embodiment of the electrolytic capacitor of the present invention.

It should be understood that the embodiment shown in FIG. 1 is merely one example of the capacitor that may be employed in the present invention. In fact, various components of the embodiment shown in FIG. 1 may be eliminated in some embodiments. For example, in certain cases, a cathode termination may be employed that lacks an upstanding portion. An example of such a configuration is shown in FIG. 2, wherein the capacitor element 33 is connected to an anode termination 62 and cathode termination 72 in a manner similar to FIG. 1 except that the termination 72 lacks an upstanding portion and simply contains a planar portion 79 formed from a first planar section 75 folded vertically above a second planar section 73 in the −z direction. In yet another embodiment, the cathode termination may contain a planar portion that is formed from only a single section. Referring to FIG. 3, for example, a cathode termination 272 is shown that contains an upstanding portion 274 and a planar portion 279. In this embodiment, the planar portion 279 is a single section that defines an interior slot 277 for receiving a conductive adhesive 281.

Figure 6:
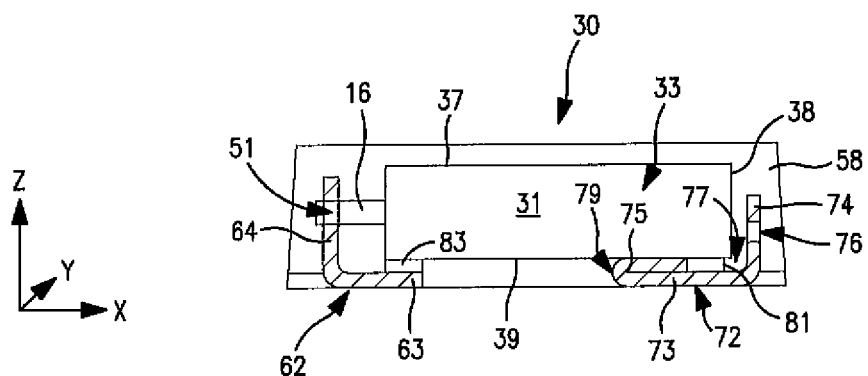
FIG. 6 is a cross-sectional view of another embodiment of the electrolytic capacitor of the present invention.
Figure 7:
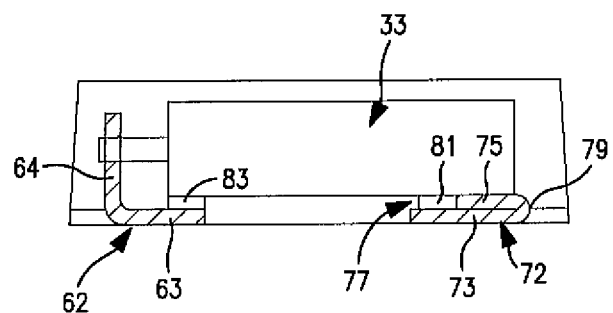
FIG. 7 is a cross-sectional view of still another embodiment of the electrolytic capacitor of the present invention.

In still other embodiments, the slot for the adhesive need not be defined in an interior of the planar portion as shown in FIGS. 1-5. Referring to FIG. 6, for example, a capacitor 30 is shown that is substantially similar to the capacitor of FIG. 1, except that the slot is not defined in the interior of the first planar section of the cathode termination. Rather, in FIG. 6, the slot 77 is a space defined between an edge of the first planar section 75 and an edge of the second planar section 73 that meets the upstanding portion 74. FIG. 7 shows a similar embodiment, except that the slot 77 is defined between an edge of the first planar section and an edge of the second planar section that does not meet the upstanding portion 74. Such slot configurations may be formed in a variety of different ways.

Figure 8:
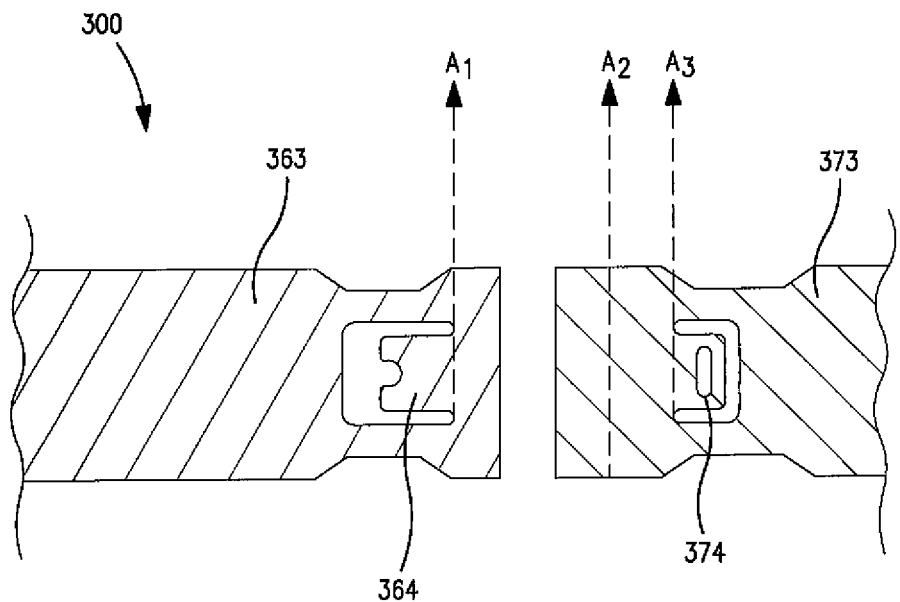
FIG. 8 is a top view of a leadframe that may be employed to form the electrolytic capacitor shown in FIG. 6.
Figure 9:
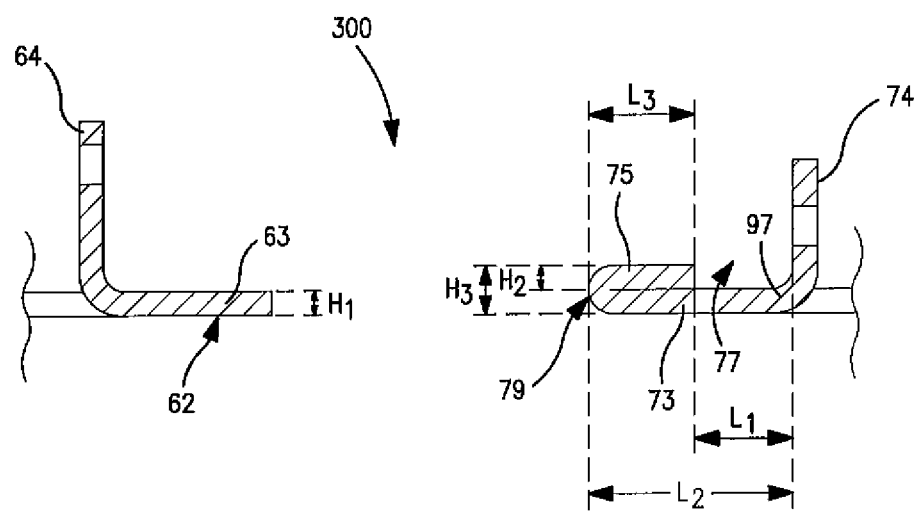
FIG. 9 is a side view of the leadframe of FIG. 8 after the anode and cathode terminations have been folded into the desired configuration.

FIGS. 8-9, for instance, illustrate one embodiment of a leadframe 300 that may be employed to form the capacitor 30 of FIG. 6. In FIG. 8, the leadframe 300 is shown in its initial "flat" configuration. In this embodiment, the anode termination is formed from a base 363 and a tab 364 extending therefrom. The tab 364 may be bent upwardly along a fold axis "$A_1$" to form the upstanding portion 64 and the U-shaped slot 51. (FIG. 6). The cathode termination is likewise formed from a base 373 and a tab 374 extending therefrom. The tab 374 may be bent upwardly along a fold axis "$A_3$" to form the upstanding portion 74. To form the planar sections 73 and 75, the base 373 is folded upwardly along axis "$A_2$." In this manner, the front portion of the base 373 will constitute the first planar section 75 and the rear portion will constitute the second planar section 73 (FIG. 6). By folding the leadframe as described above, the anode and cathode terminations may be formed in the desired configuration. Referring to FIG. 9, for instance, the leadframe 300 is shown in its folded configuration and contains an anode termination 62 and a cathode termination 72. As indicated above, the anode termination 62 of this embodiment includes a planar portion 63 and an upstanding portion 64 that defines a slot 51 for receiving the anode lead. The cathode termination 72 likewise contains an upstanding portion 74 that defines an aperture 76, a first planar section 75, and a second planar section 73. In the illustrated embodiment, the planar portion 79 is folded so that the first section 75 does not extend across the entire length of the second section 73. In other words, the length of the first section 75 is less than the length of the second section 73. In this manner, the slot 77 is formed that is defined between an edge 95 of the first section 75 and an edge 97 of the second section 73. The values of $L_1$, $L_2$, $L_3$, $H_1$, $H_2$, and $H_3$ in the embodiment shown in FIG. 9 may be selectively controlled, such as within the ranges discussed above.

Regardless of the particular configuration employed, once the terminations are in the desired configuration, the capacitor element is positioned thereon. Referring again to FIG. 1, for example, the capacitor element 33 may be positioned so that the anode lead 16 is received by the slot 51. The anode lead 16 may be electrically connected to the slot 51 using any technique known in the art, such as mechanical welding, laser welding, conductive adhesives, etc. The lower surface 39 of the capacitor element 33 rests on the planar portion 63 of the anode termination 62 via an insulating material (not shown), which electrically isolates the anode and cathode terminations. The lower surface 39 also rests on the first planar section 75 of the cathode termination 72 and is connected thereto by a conductive adhesive 81. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Application Publication No. 2006/0038304 to Osaka, et al., which is incorporated herein in its entirety by reference thereto for all purposes. Any known technique may be employed to cure the conductive adhesive. For example, a heat press may be used to apply heat and pressure to ensure that the capacitor element 33 is adequately adhered to the cathode termination 72 by the adhesive.

Once attached to the leadframe, the capacitor element may be encapsulated with a molding material 58, such as an epoxy resin, silica, or any other known encapsulating material. The width and length of the case may vary depending on the intended application. Suitable casings may include, for instance, "A", "B", "F", "G", "H", "J", "K", "L", "M", "N", "P", "R", "S", "T", "W", "Y", or "X" cases (AVX Corporation). Regardless of the case size employed, the capacitor element 33 is encapsulated so that at least a portion of the anode and cathode terminations 62 and 72 are exposed for mounting onto a circuit board. In the embodiment illustrated in FIG. 1, for example, the planar portion 63 of the anode termination 62 is exposed, but the upstanding portion 64 is encapsulated within the molding material 58. Likewise, the second planar section 73 of the cathode termination 72 is also exposed, but the first planar section 75 and the upstanding portion 74 are both encapsulated within the molding material 58. Among other things, encapsulating both a planar and upstanding portion of the cathode termination can result in a capacitor having better mechanical stability and thus improved electrical performance.

The present invention may be better understood by the following examples.

Test Procedures

Equivalent Series Resistance ("ESR")

Equivalence series resistance may be measured using a Keithley 3330 Precision LCZ meter with Kelvin Leads 2.2 volt DC bias and a 0.5 volt peak to peak sinusoidal signal. The operating frequency was 100 kHz and the temperature was 23° C.±2° C.

Capacitance ("Cap")

The capacitance was measured using a Keithley 3330 Precision LCZ meter with Kelvin Leads with 2.2 volt DC bias and a 0.5 volt peak to peak sinusoidal signal. The operating frequency was 120 Hz and the temperature was 23° C.±2° C.

Leakage Current:

Leakage current ("DCL") was measured using a leakage test set that measures leakage current at a temperature of 25° C. and at the rated voltage after a minimum of 60 seconds.

EXAMPLE 1

A tantalum anode (2.30 mm×0.50 mm×2.30 mm) was initially anodized at 17.1V in a liquid electrolyte to 150 μF. A conductive polymer coating was then formed by dipping the anode into a butanol solution of iron (III) toluenesulfonate (CLEVIOS™ C) for 15 minutes and consequently into 3,4-ethylenedioxythiophene (CLEVIOS™ M) for 1 minute. After 45 minutes of polymerization, a thin layer of poly(3,4-ethylenedioxythiophene) was formed on the surface of the dielectric. The parts were washed in methanol to remove reaction by-products, re-anodized in a liquid electrolyte, and washed again in methanol. The polymerization cycle was repeated 12 times. The parts were then coated by graphite and silver as is known in the art. Once formed, the capacitor element was placed in a pocket of a leadframe as shown in FIG. 1. As shown in FIG. 1, the leadframe contained a cathode termination having a first planar section 75 that is folded vertically above a second planar section 73. A slot 77 was defined in the interior of the first planar section 75. A conductive adhesive 81 was disposed in the slot 77 before the part was placed on the leadframe. Once positioned in the desired manner, the anode wire was welded to the anode termination using a pulsed laser beam. The capacitor element was then encapsulated within an "L" case having a length of about 3.50 mm, a height of about 1.00 mm, and a width of about 2.80 mm. The finished part was treated with lead-free reflow. 756 parts were made by the method described above.

EXAMPLE 2

Capacitors were formed in the manner described in Example 1, except that the cathode termination contained only a single planar section. That is, the cathode termination lacked the planar section 75 and the slot 77 shown in FIG. 1. Instead, the cathode termination simply contained a single planar section adjacent to the lower surface of the capacitor element and an upstanding portion adjacent to the rear surface of the capacitor elements. An adhesive was disposed on an upper surface of the planar section to connect the capacitor element to the cathode termination. 756 parts were made by this method. The parts of Examples 1 and 2 were then subjected to electrical testing. The median results are set forth below in Table 1.

TABLE 1

| | Electrical Performance | | |
|---|---|---|---|
| | DCL [μA] | ESR [mOhm] | Cap [μF] |
| Example 1 | 23.0 | 109 | 144.8 |
| Example 2 | 51.9 | 159 | 145.1 |

As indicated, the parts assembled using a cathode termination as described in Example 1 had a lower leakage current and ESR than the parts of Example 2. Further, more than 98% of the parts of Example 1 were determined to pass the electrical performance testing, as compared to only 91% of the parts of Example 2. It is believed that the low yield was due to the fact that the anode was not positioned symmetrically within the case, which led to a higher likelihood of delamination from the cathode termination.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A capacitor comprising:
   a capacitor element that defines an upper surface, lower surface, front surface, and rear surface, wherein the capacitor element includes an anode, dielectric layer overlying the anode, and a cathode overlying the dielectric layer that includes a solid electrolyte, and wherein an anode lead is electrically connected to the anode;

a cathode termination that is electrically connected to the cathode and contains a planar portion oriented generally parallel to the lower surface of the capacitor element, wherein the planar portion defines a first slot within which a conductive adhesive is disposed, the conductive adhesive connecting the planar portion of the cathode termination to the capacitor element, wherein the planar portion of the cathode termination contains a first planar section that is folded vertically and disposed above a second planar section, wherein at least a portion of the first planar section is in contact with the second planar section, and further wherein the first slot is defined by at least the first planar section;

an anode termination that is electrically connected to the anode lead, wherein the anode termination contains an upstanding portion positioned generally perpendicular to the lower surface of the capacitor element and a planar portion positioned generally parallel to the lower surface of the capacitor element, wherein the anode lead is electrically connected to the upstanding portion of the anode termination, and further wherein the upstanding portion of the anode termination defines a second slot for receiving the anode lead; and a molding material that encapsulates the capacitor element and leaves exposed at least a part of the anode termination and at least a part of the cathode termination.

2. The capacitor of claim 1, wherein the first slot has a profile that is generally rectangular-shaped or triangular-shaped.

3. The capacitor of claim 1, wherein the first slot has a generally circular cross-sectional dimension.

4. The capacitor of claim 1, wherein the first slot is defined in an interior of the planar portion of the cathode termination.

5. The capacitor of claim 1, wherein the first slot is defined in an interior of at least the first planar section.

6. The capacitor of claim 1, wherein the length of the first planar section is less than the length of the second planar section.

7. The capacitor of claim 6, wherein the slot is defined between an edge of the first planar section and an edge of the second planar section.

8. The capacitor of claim 1, wherein the first planar section is encapsulated by the molding material and wherein at least a part of the second planar section remains exposed.

9. The capacitor of claim 1, wherein the ratio of the thickness of the slot to the total thickness of the planar portion of the cathode termination is from about 0.2 to about 0.8.

10. The capacitor of claim 1, wherein the planar portion of the cathode termination is positioned adjacent to the lower surface of the capacitor element.

11. The capacitor of claim 1, wherein the cathode termination further contains an upstanding portion positioned generally perpendicular to the lower surface of the capacitor element.

12. The capacitor of claim 11, wherein the upstanding portion of the cathode termination is positioned adjacent to the rear surface of the capacitor element.

13. The capacitor of clam 11, wherein the upstanding portion of the cathode termination is encapsulated by the molding material.

14. The capacitor of claim 1, wherein an insulating material is disposed between the capacitor element and the planar portion of the anode termination.

15. The capacitor of claim 1, wherein the anode includes tantalum, niobium, or an electrically conductive oxide thereof.

16. The capacitor of claim 1, wherein the solid electrolyte includes a conductive polymer.

17. The capacitor of claim 16, wherein the conductive polymer is poly(3,4-ethylenedioxythiophene).

18. A method for forming a capacitor from a capacitor element and a leadframe, wherein the leadframe contains an anode portion and a cathode portion, the cathode portion including a base, and further wherein the capacitor element includes an anode, dielectric layer overlying the anode, cathode overlying the dielectric layer that includes a solid electrolyte, the method comprising:

vertically folding the base of the cathode portion to form a planar portion oriented generally parallel to a lower surface of the capacitor element, wherein the planar portion contains a first planar section that is positioned vertically above a second planar section, wherein at least a portion of the first planar section is in contact with the second planar section, wherein a slot is defined by at least the first planar section;

disposing a conductive adhesive within the slot;

positioning the capacitor element onto the leadframe so that the capacitor elements contacts the conductive adhesive;

bending the anode portion of the leadframe to form an upstanding anode termination portion positioned generally perpendicular to the lower surface of the capacitor element and a planar portion positioned generally parallel to the lower surface of the capacitor element, wherein the anode lead is electrically connected to the upstanding anode termination portion, and further wherein the upstanding portion of the anode termination defines a second slot for receiving the anode lead; and encapsulating the capacitor element with a molding material so that at least a part of the anode portion and at least a part of the cathode portion of the leadframe remain exposed.

19. The method of claim 18, wherein the first slot is defined in an interior of at least the first section.

20. The method of claim 18, wherein the cathode portion further comprises a tab that extends from the base, the method further comprising bending the tab to form an upstanding cathode termination portion.

* * * * *